S. KELLER.
Walking Planter.
No. 48,871. Patented July 18, 1865.
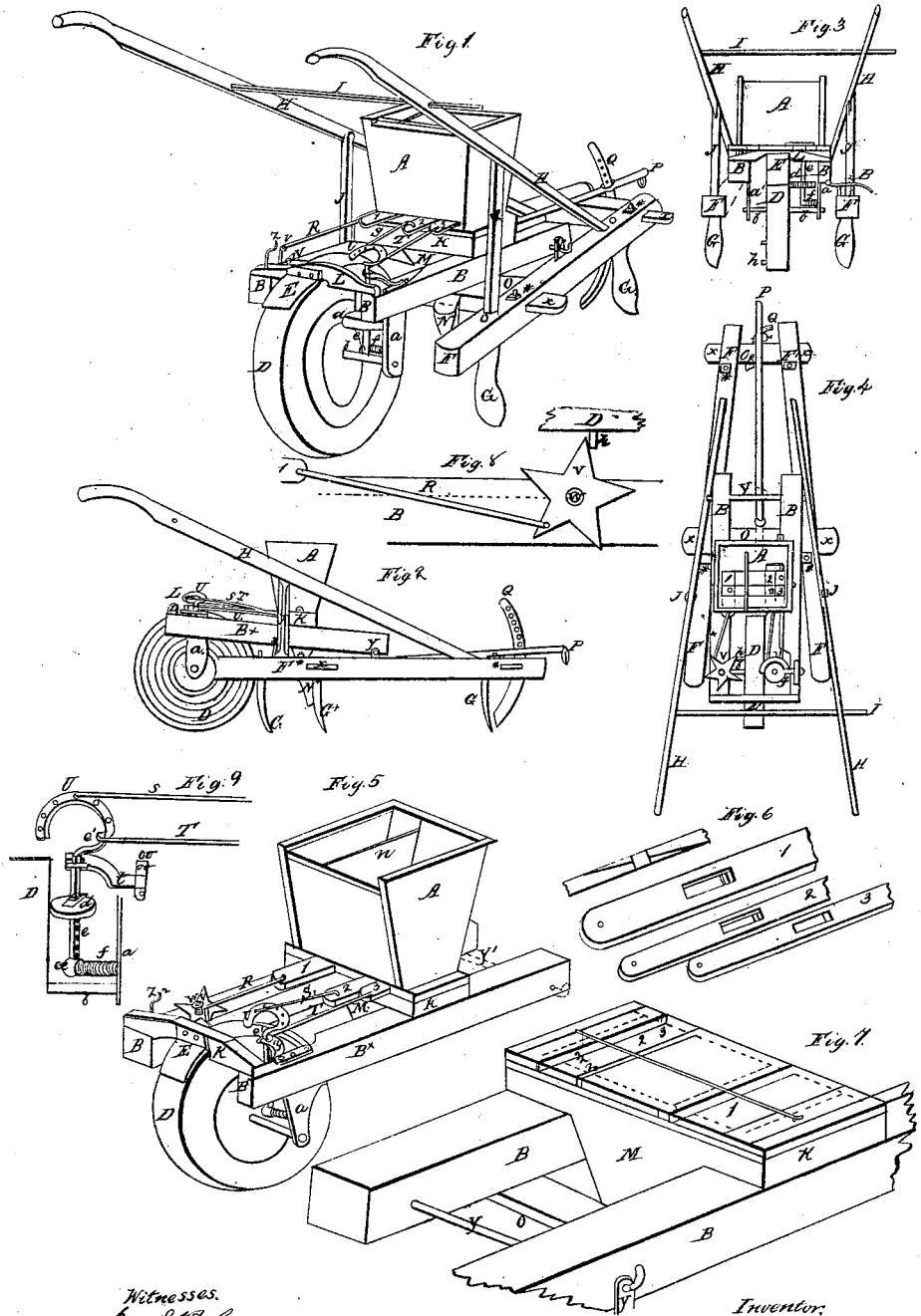
Witnesses.
Inventor:
S Keller

UNITED STATES PATENT OFFICE.

SEBASTIAN KELLER, OF ELIZABETHTOWN, ASSIGNOR TO HIMSELF AND JACOB L. GOOD, OF LANCASTER COUNTY, PENNSYLVANIA.

IMPROVEMENT IN COMBINED SEEDER AND CULTIVATOR.

Specification forming part of Letters Patent No. 48,871, dated July 18, 1865.

*To all whom it may concern:*

Be it known that I, SEBASTIAN KELLER, of Elizabethtown, in the county of Lancaster and State of Pennsylvania, have invented a new and useful Improvement on Combined Cultivators and Seed-Planters; and I do hereby declare that the following is a full, clear, and exact description of the construction and operation of the same, reference being had to the annexed drawings, making a part of this specification, in which—

Figure 1 is a perspective view; Fig. 2, a longitudinal elevation; Fig. 3, a transverse rear section; Fig. 4, plan or vertical view; Fig. 5, the seeder removed; Figs. 6 and 7, the slides and bottom of the hopper enlarged; Fig. 8, the star-crank; Fig. 9, the semicircular crank and appliances separately shown. Fig. 7 shows the forward portion of the hopper-base K.

In order to clearly understand my combination, I will proceed to describe the construction and operation.

It consists of two separate parts, in such a manner that the cultivator can be used, like any ordinary cultivator without the seed-planter, for working the soil after the seeding is accomplished, and apart from the seed-planter has in itself no special novelties except the improved utility in arranging its parts.

The pole is linked to the central cross-piece, O, bracing the side pieces, F F, of the cultivator. On the front cross-brace, $O^2$, there is a clod-cutter, Q, with a series of holes, on which the slotted pole P can be raised or lowered by a pin. These cross-braces are also provided with screw-followers (marked ※) for providing against shrinking or becoming loose. There is also a perforated staple, Y, on the side pieces for the pivot-rod Y' to hold the seeder when placed upon the cultivator. The central or scoring shovel, $G^×$, is also provided with a tube or dropping-hopper, N, attached to the rear of the cross-brace O, which comes under the discharging-spout M on the front of the hopper A. Said spout N is out of the way, so as not to impede the shovel when simply cultivating, which and the staple Y are the only parts of the cultivator having any relation to the seeder. The two hind shovels also cover the seed dropped into the score, and are so placed as to ridge the covered seed in a manner peculiarly adapted to prevent washing, on hillsides especially. I am not aware of any cultivator constructed or arranged like mine in the points named, yet do not deem them as a part of my invention apart from the seeder attachment.

The seeding attachment (shown separately by Fig. 5) consists of two side pieces, $B B^×$, braced together by the base K of the hopper A and rear cross-piece, L, with a hole on each portion in front for the rod $Y^2$, passing through the staples Y on the cultivator, in which it has an up-and-down motion, and is independent of the up-and-down motions of the cultivator, as the roller-pulley D on its shaft $b b$ or axle is held in the brackets $a'$ $a$, affixed on the inner sides of said side pieces, B B'. Thus the roller-pulley D has a uniform pressure, and rises and falls with the undulations of the ground, and carries the entire combination of the seeder with it in its motions, as well as operating all its parts. The sides of the roller-pulley D are perpendicular. Over its axle, on the right-hand side, there is a perpendicular graduated shaft, $e$, revolving in a saddle-like step, $e$ $e$, which latter is supported on a horizontal brace and operated against by a coiled or other spring, $f$, between said saddle $e$ $e$ and pendent bracket $a$, supporting said saddle-brace, (shown surrounded by a coiled spring, $f$,) for the purpose of keeping up the requisite pressure of an adjustable horizontal pulley, $d$, operating at right angles against the face or vertical side of the roller-pulley D. This pulley-shaft $e$ is held in a brace-plate, $t$, above, also made adjustable on the side piece, $B^×$, by a cross screw-plate, $o$ $o$, above which it is bent out crank-fashion, and having a short perpendicular neck, to which the connecting-rod T is attached. The top is provided or forged into a horizontal semicircular plate, with a series of perforations equidistant from a common center, by which holes the connecting-rod S can be adjusted, so as to produce a double-crank motion of any desired throw. This double crank U $e'$ on the pulley-shaft $e$ operates the corn-planting valves 2 3, as will be shown when we describe its operation. On the rear of the other side piece, B, there is a five-pointed star, V, (shown separately by Fig. 8,) directly opposite the crank arrangement or double crank just mentioned. This star-crank has a central column with a coiled-spring attachment to keep it in place. One of the points has a perpendicular pin for the reception of the connecting-rod R to valve 1. These star-points are so arranged that they project over the side piece in close proximity to the vertical side of the roller-pulley as they are successively moved by coming in contact with a pin or pins, $h$, on the face of said roller-pulley D, so as to move forward one point when coming in contact with said pin or pins $h$, said star requiring five motions in order to complete the circle or crank operation.

The construction of the hopper is simple. There are two departments, $m$, for pumpkin or other seeds, with its valve 1—$n$, ordinarily for planting corn, having two valves, 2 and 3, side by side. Fig. 6 shows these valves on their upper face, the under side having the beveled slots in a reversed condition to facilitate the planting and cleaning of the same. An edge view is also shown. The openings in the bottom of the hopper-base convey the seed dropped through the valve-openings into a tube, M, from both apartments, which conveys them into the central tube, N, on the cross-pieces O of the cultivator in the rear of the shovel $O^\times$, forming the score aforesaid in the ordinary manner.

The operation of the several novelties are, first, the horizontal adjustable pulley $d$ on its graduated shaft $e$ can be slid nearer or father from the center of the roller-pulley D, so as to increase or lessen the circuit of travel on the face, as shown by the series of circles in Fig. 2, the circumference of the pulley $d$ causing it to revolve the shaft once, twice, or oftener in each revolution of the roller-pulley, thereby operating the crank-and-valve motion faster or slower, according as the hills are desired to be closer or farther apart, being capable of any adjustment to the nicest point. For a round hill the two connecting-rods are brought over each other by inserting the rod S into the inner hole of the semicircle. Each remove of a hole will lengthen the hill two inches, so that when the rod S is hooked into the outer hole the hill will be twelve inches long. This double-crank motion operating the valves alternately, or the two valves simultaneously, secures a wide range as well as a more certain delivery from this double motion and beveled openings in opposite directions, aided by a wire stretched across the bottom of the hopper at such a height as not only to stir the seed, but so as to prostrate it into the beveled upper groove and the rear obstruction of the perpendicular side, to insure its being dropped through the aperture into the conducting-spout.

The valve 1 in the department $m$ is peculiarly fitted for pumpkin-seed, but will plant beens, pease, and the like equally well. The connecting-rod R on the star-crank is operated faster or slower, according to the number of pins on the face of the roller-pulley D. With one pin only the valve will but seed once in every five revolutions, thus removing the hills in which the seed is lodged to the distance apart traversed. By increasing the number of pegs the distance is diminished to one-half, one-third, or in proportion. The star of five points has this peculiarity, that as no two points come in a direct central line the action of the crank will produce a jarring motion and aid in dislodging the seed at the point when the opening of the valve is over the discharge-opening in the base of the hopper. By this simple contrivance pumpkins can be planted from four to sixteen feet apart.

E shows a curved scraper over the pulley-wheel to cleanse it from adhering soil.

Believing that this description, aided by the drawings, will clearly explain my invention, I will simply add that when it is desired to omit one or two rows in planting pumpkin-seed or the like the connecting-rod R can be shifted from the star to the curved rod Z on the rear cross-piece, L, when it will be arrested until replaced. I would also mention that a simple side lever and ratchet, B, Fig. 3, for raising the side pieces with the roller-pulley from the ground to arrest its operations, when desirable, is employed. This was inadvertantly omitted on the model, and as it embraces no novelty it is deemed of no great importance further than its use.

I am aware that numerous combined seeders and cultivators have been patented; but I am not aware that the arrangement for operating the valves I have invented, in combination with my vibrating seeder, constructed as herein set forth, was ever known.

What I claim as my invention, and desire to secure by Letters Patent, is—

1. The construction of the semicircular crank U and crank $e'$, forming the top of the pulley-shaft $e$, in combination with its friction-pulley $d$, saddle-step, and spring-brace connection $f$, arranged and operating, substantially in its adjustability, in the manner and for the purpose specified.

2. The five-pointed-star crank $v$ for operating the valve 1, in combination with the pin or pins $h$ on the face of the driving or roller pulley D, constructed and operating in the manner set forth.

3. The flat-sided roller-pulley D, supported in the brackets $a'$ $a$ on the vibrating hopper-frame B B$^\times$, in combination with the pivot-rod attachment to the cultivator, in the manner and for the purpose specified.

4. The construction and operation of the valves 1, 2, and 3, in combination with the connecting-rods R S T, and the double crank U $e'$, and star crank V, operated in the manner described.

S. KELLER.

Witnesses:
 DANL. BALMER,
 A. GREENEWALT.